United States Patent [19]

Lupke et al.

[11] 4,136,143

[45] Jan. 23, 1979

[54] APPARATUS FOR AND METHOD OF PRODUCING CORRUGATED THERMOPLASTIC TUBING

[76] Inventors: Gerd P. H. Lupke, 46 Stornoway Cres.; Manfred A. A. Lupke, 35 Ironside Cres., both of Thornhill, Ontario, Canada

[21] Appl. No.: 770,664

[22] Filed: Feb. 22, 1977

[51] Int. Cl.² ............................................. B29D 23/03
[52] U.S. Cl. .................................... 264/508; 425/532; 425/392; 425/396; 264/530; 264/542; 264/564
[58] Field of Search .............. 425/539, 540, 392, 396, 425/532; 264/89, 95, 99

[56] References Cited

U.S. PATENT DOCUMENTS

| | | | |
|---|---|---|---|
| 2,519,375 | 8/1950 | Jargstorff et al. | 18/14 |
| 3,385,918 | 5/1968 | Jack et al. | 264/180 |
| 3,412,189 | 11/1968 | Sullivan | 264/95 |
| 3,426,111 | 2/1969 | Simpson | 264/48 |
| 3,529,047 | 9/1970 | Yoshida et al. | 264/89 |
| 3,677,676 | 7/1972 | Hegler | 425/539 X |
| 3,725,519 | 4/1973 | Seifried et al. | 264/89 X |
| 3,857,917 | 12/1974 | Reade | 264/89 |
| 3,919,367 | 11/1975 | Moroschak | 264/40 |
| 3,924,992 | 12/1975 | Hegler | 425/539 X |
| 3,976,410 | 8/1976 | Jack et al. | 425/71 |
| 3,981,663 | 9/1976 | Lupke | 425/371 X |
| 4,003,685 | 1/1977 | Maroschak | 425/539 X |

*Primary Examiner*—Richard B. Lazarus
*Attorney, Agent, or Firm*—Ridout & Maybee

[57] ABSTRACT

In order, in the molding of corrugated thermoplastic tubing, to overcome the disadvantage that pressurized air which is supplied to a zone within the tube of thermoplastic material as it is extruded from an extrusion head into the entrance of a tubular mold tunnel may tend to cause rupturing of the tube at the area immediately adjacent to the extrusion head where the tube is unsupported by the wall of the tubular mold tunnel the pressurized gas is supplied at a low pressure to a first zone within the tube of thermoplastic material to support the tube against the wall of the tunnel, and pressurized gas at a higher pressure is supplied to a second zone within the tube to urge the tube outwardly into the corrugations of the tubular mold tunnel. A first sealing arrangement separates the first zone from the second zone which is disposed downstream of the first zone, and a second sealing arrangement defines the downstream end of the second zone.

10 Claims, 4 Drawing Figures

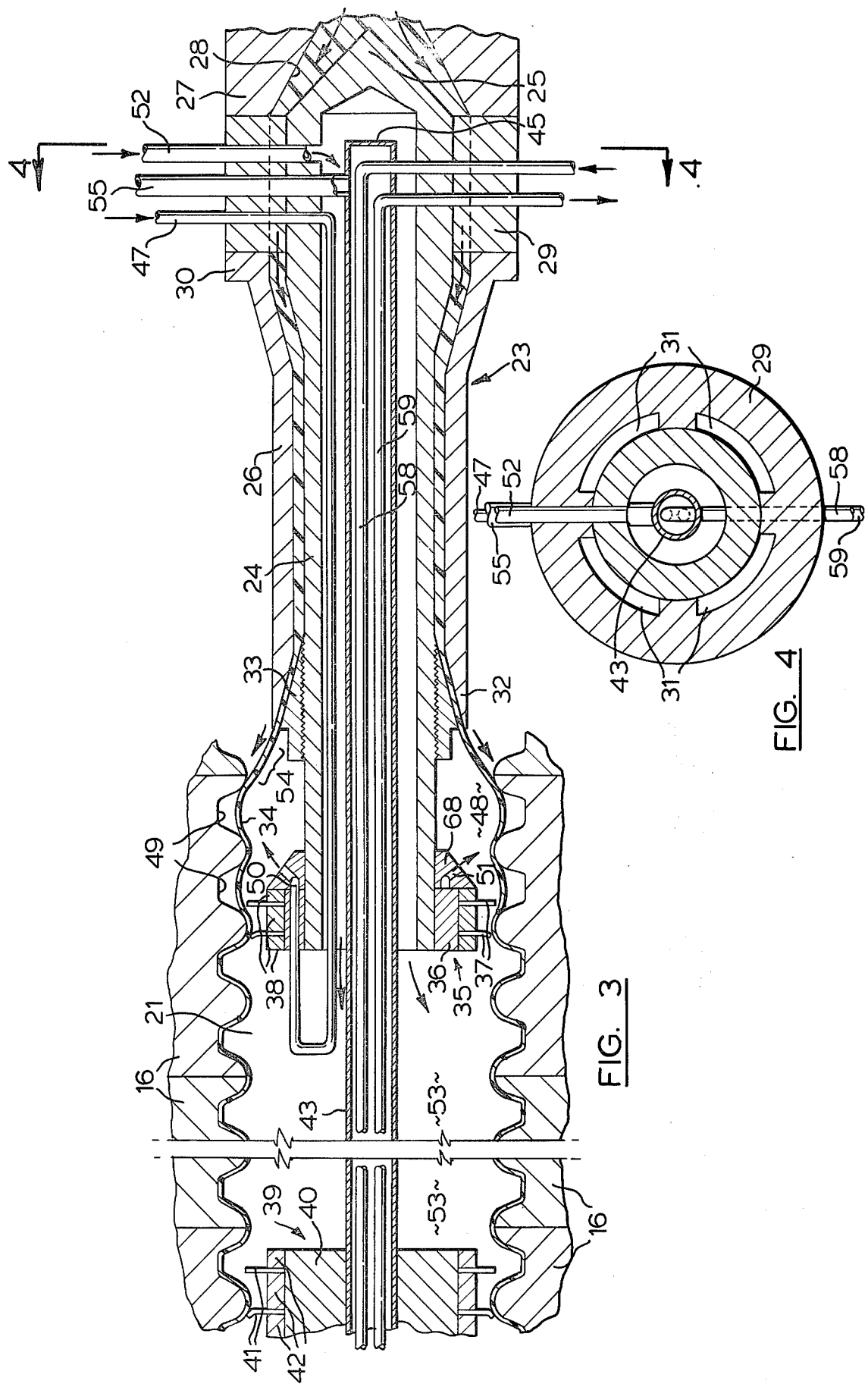

APPARATUS FOR AND METHOD OF PRODUCING CORRUGATED THERMOPLASTIC TUBING

This invention is concerned with apparatus for producing corrugated thermoplastic tubing, and more particularly with such apparatus which is of the type comprising a pair of complementary mold assemblies each of which has an endless array of articulately interconnected mold blocks, and drive means for driving the mold blocks of each mold assembly in synchronism with the mold blocks of the other mold assembly along a forward run in which the mold blocks of the mold assemblies are in cooperative interengagement to provide an axially extending tubular mold tunnel having a corrugated wall, and back along a return run. An extrusion head is disposed at the entrance to the tubular mold tunnel for forming a tube of thermoplastic material, and gas supply means is provided for supplying pressurized gas to dispose the tube of thermoplastic material against the corrugated wall of the tubular mold tunnel.

It is a disadvantage of apparatus of the type hereinabove described as hitherto known that, during the production of corrugated thermoplastic tubing using the apparatus, there can be a tendency for the pressurized gas which is supplied by the gas supply means to cause rupturing of the tube of thermoplastic material at the area immediately adjacent to the extrusion head where the tube is unsupported by the wall of the tubular mold tunnel, the thermoplastic material of the tube in this area being of course at a high temperature and hence being relatively soft.

It is a primary object of one aspect of the present invention to provide apparatus of the type hereinbefore described in which the above disadvantage is substantially obviated or mitigated.

According to this one aspect of the present invention there is provided apparatus of the type herein before described, wherein said gas supply means is for supplying pressurized gas at a first pressure to a first zone within the tube of thermoplastic material in the tubular mold tunnel for supporting said tube against the cooperatively interengaged mold blocks forming the tunnel, and for supplying pressurized gas at a second pressure which is higher than said first pressure to a second zone within the tube of thermoplastic material in the tubular mold tunnel for urging said tube outwardly into the corrugations in the wall of the tubular mold tunnel. A first sealing arrangement separates the first zone which is disposed adjacent to the extrusion head from the second zone which is disposed downstream of the first zone, and a second sealing arrangement defines the downstream end of the second zone.

The present invention is also concerned with the provision of a method of producing corrugated thermoplastic tubing, and it is a primary object of a second aspect of the invention to provide such a method in which the above-described disadvantage is substantially obviated or mitigated.

According to this second aspect of the invention there is provided a method of producing corrugated thermoplastic tubing, wherein the method comprises extruding a tube of thermoplastic material from an extrusion head into the entrance of an axially extending, corrugated walled, tubular mold tunnel which is formed by cooperatively interengaged mold blocks of a pair of complementary mold assemblies driven in synchronism along a forward run and back along a return run, the mold blocks of each mold assembly being articulately interconnected in an endless array, supplying pressurized gas at a first pressure to a first pressurizable zone within the tube of thermoplastic material in the tubular mold tunnel to support said tube against the cooperatively interengaged mold blocks forming the tunnel, and supplying pressurized gas at a second pressure which is higher than said first pressure to a second pressurizable zone within the tube of thermoplastic material in the tubular mold tunnel to urge said tube outwardly into the corrugations in the wall of the tubular mold tunnel. The first zone is disposed adjacent to the extrusion head at the entrance of the tubular mold tunnel and is separated by a first sealing arrangement from the second zone which is disposed downstream of the first zone and the downstream end which is defined by a second sealing arrangement.

In order that the invention may be more clearly understood and more readily carried into effect the same will now, by way of example, be more fully described with reference to the accompanying drawings in which FIG. 1 is a side view of apparatus according to a preferred embodiment of the invention;

FIG. 3 is a vertically sectioned view, on a further enlarged scale, of part of the apparatus shown in FIG. 2; and FIG. 4 is a sectioned view on the line 4—4 in FIG. 3.

Figure 1:
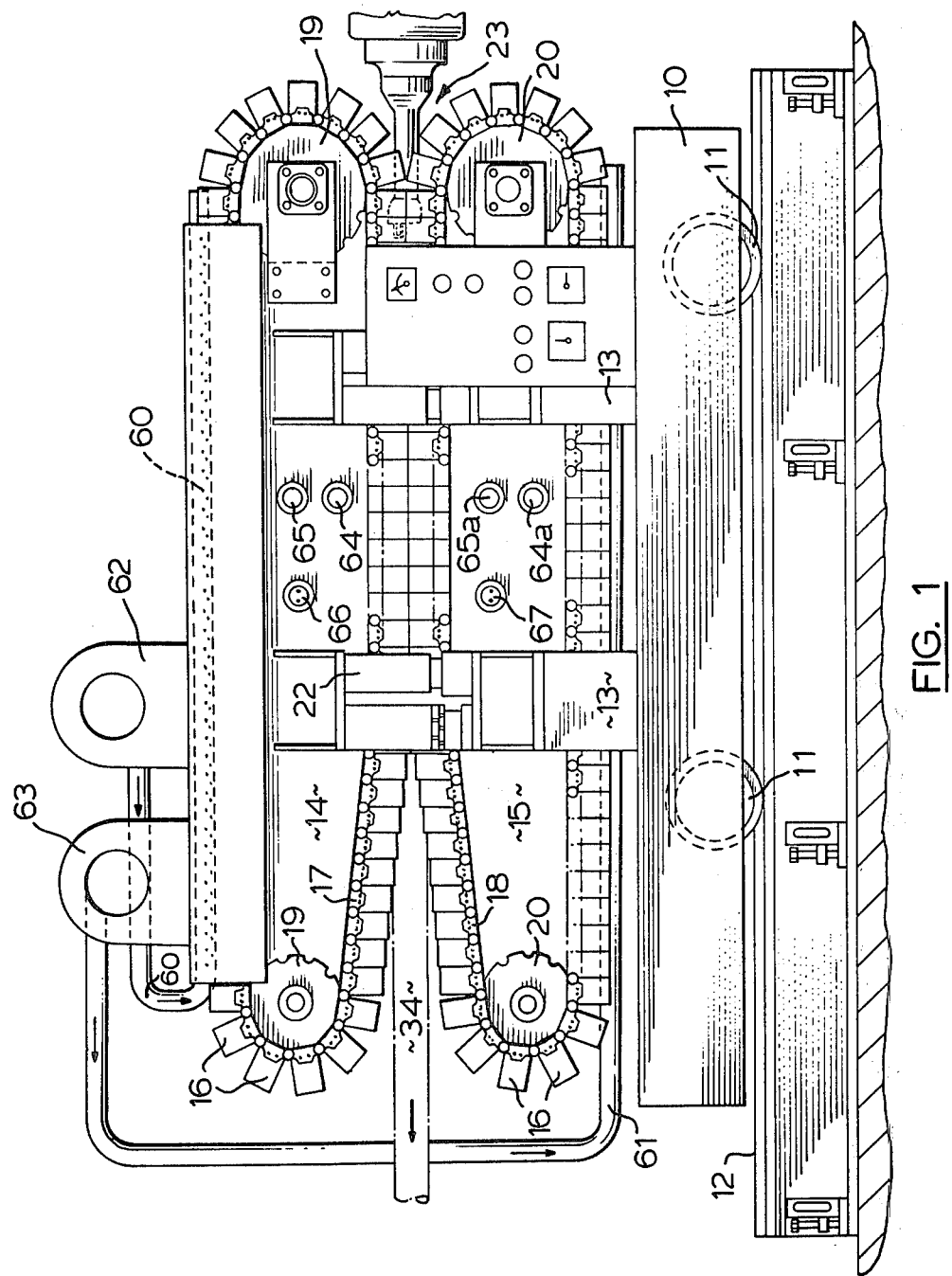
Figure 2:
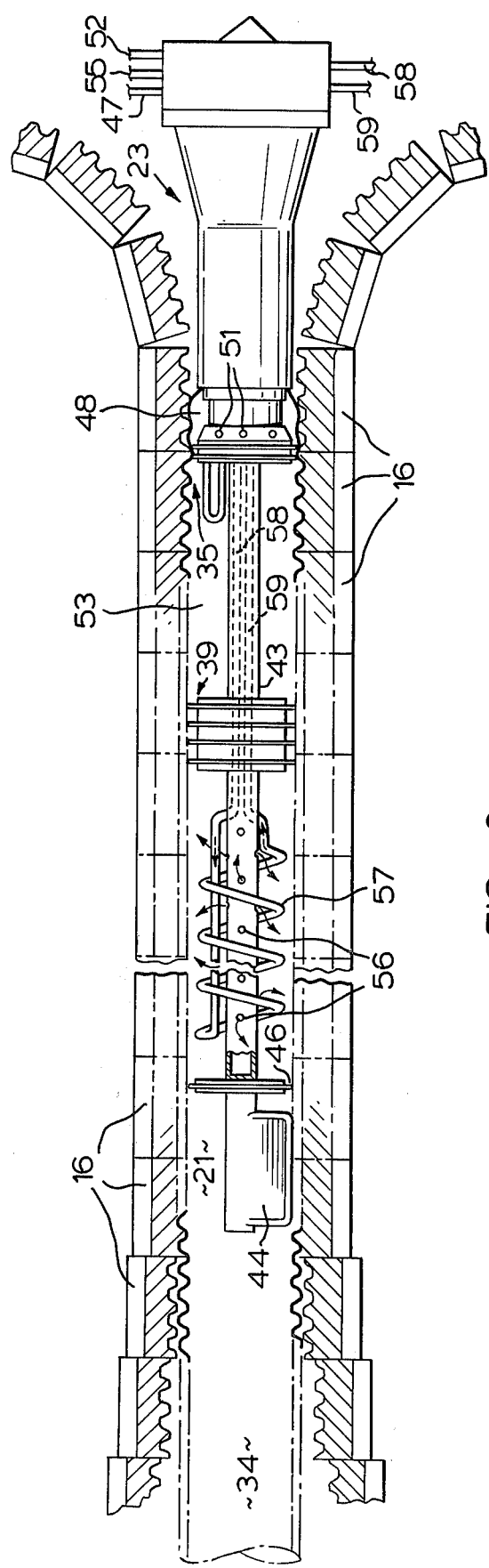
FIG. 2 is a vertically sectioned view, on an enlarged scale, of a portion of the apparatus shown in FIG. 1.

Referring to the drawings and in particular to FIG. 1 thereof, the apparatus according to the preferred embodiment of the invention comprises a wheeled structure including a carriage 10 having wheels 11 which run on tracks 12. A support structure 13 which is mounted on the carriage 10 supports a pair of complementary upper and lower mold assemblies 14 and 15, respectively, each mold assembly 14 and 15 comprising an endless array of articulately interconnected mold blocks 16. The mold assembly 14 further comprises a pair of transversely spaced endless conveyor chains (only one of which is shown in the drawings and is denoted by the reference numeral 17), with each mold block 16 of the assembly 14 extending transversely between opposed lengths of these chains. The mold assembly 15 likewise further comprises a pair of endless conveyor chains (only one of which is shown in the drawings and is denoted by the reference numeral 18), with each mold block 16 of the assembly 15 extending transversely between opposed lengths of this pair of chains including the chain 18. The chains are entrained around drive sprockets 19 and 20, with drive means (not shown) being connected to at least one of the sprockets 19 and to at least one of the sprockets 20 for operatively driving the mold blocks 16 of each assembly 14 and 15 in synchronism along a forward run and back along a return run, the mold blocks 16 of the assemblies 14 and 15 being, in the forward runs, in cooperative interengagement to define an axially extending tubular mold tunnel 21 having a corrugated wall (FIGS. 2 and 3).

The support structure 13 includes mechanical jacks 22 interconnecting the upper and lower mold assemblies 14 and 15 and operable for raising the upper assembly 14 from the lower assembly 15, when required, to permit easy access for servicing.

By means of the wheeled carriage 10 the mold assemblies 14 and 15 are operatively positioned to locate an extrusion head 23 at the entrance to the tubular mold tunnel 21, the extrusion head 23 being operatively coupled to the nozzle of an extrusion machine (not shown) which may be of conventional form. If required, the mold assemblies 14 and 15 can be moved away from the extrusion head 23 by movement of the wheeled carriage 10 along the tracks 12, in order to provide access to the extrusion head 23.

With particular reference to FIG. 3, the extrusion head 23 comprises an inner tubular member 24 which is coaxial with the tubular mold tunnel 21 and which has a conically shaped end portion 25. Coaxially disposed relative to the inner tubular member 24 is an outer tubular member 26, a member 27 being provided which has a frusto-conically shaped recess 28 into which the conical end portion 25 of the member 24 projects, with an annular member 29 which is mounted on the inner tubular member 24 adjacent to the conical end portion 25 thereof being disposed between the member 27 and an adjacent flanged end portion 30 of the outer tubular member 26.

Thermoplastic material such as, for example, polyvinyl chloride or polypropylene operatively flows from the nozzle of the extrusion machine to which the extrusion head 23 is operatively coupled through the conically shaped space bounded by the recess 28 of the member 27 and the end portion 25 of the inner tubular member 24, through a plurality of, say, four arcuate slots 31 provided in the member 29, and through the annular space between the inner and outer tubular members 24 and 26, respectively, the thermoplastic material being extruded through the space between a tapered end portion 32 of the tubular member 26 and a frusto-conical member 33 which is mounted on the inner tubular member 24 to form a tube 34 of the thermoplastic material at the entrance to the tubular mold tunnel 21. The member 33 is screw-threadedly mounted on the inner tubular member 24 to permit axial adjustment of the member 33 thereby to change the thickness of the tube 34 which is extruded from the extrusion head 23.

Mounted on the forward end of the inner tubular member 24 is a first sealing arrangement 35 which comprises a collar 36 on which is mounted a plurality of axially spaced rings 37 which are formed of a resiliently deformable material such as, for example, a silicon rubber and the inner peripheral portions of which are fixedly clamped between clamping rings 38 mounted on the collar 36.

Axially spaced forwardly, i.e. downstream, of the first sealing arrangement 35 is a second sealing arrangement 39 comprising a collar 40 and a plurality of axially spaced rings 41 which, as in the case of the rings 37, are of resiliently deformable material such as, for example, a silicon rubber and the inner peripheral portions of which are fixedly clamped between clamping rings 42 mounted on the collar 40.

Coaxially mounted within the inner tubular member 24 is a tube 43 the forward end portion of which remote from the extrusion head 23 carries a rider 44 which operatively rests on the internal surface of the molded tube 34 to support this forward end portion of the tube 43, the other end 45 of the tube 43 being closed. A baffle constituted by an annular seal 46 is carried by the tube 43 at a position axially spaced forwardly of the second sealing arrangement 39 the collar 40 of which is also mounted on the tube 43.

Gas supply means comprising a duct 47 is operatively connected to an appropriate source of pressurized gas such as air for supplying this pressurized air at a first pressure to a first zone 48 which extends within the tube 34 of thermoplastic material from the extrusion head 23 to the first sealing arrangement 35, this pressurized air at the first pressure serving, as is most clearly shown in FIG. 3, operatively to support the tube 34 against the corrugated wall of the tubular mold tunnel 21, but without necessarily urging the thermoplastic material of the tube 34 into the corrugations 49 of the corrugated wall of the tubular mold tunnel 21 at least to any significant extent. As shown in FIG. 3 the duct 47 is disposed through the member 29 and the annular space between the tube 43 and the inner tubular member 24, and is reflexly bent with the discharge end portion thereof disposed within the collar 36 of the first sealing arrangement 35 and in communication with an annular groove 50 provided in an annular member 68 which is mounted on the inner tubular member 24, the groove 50 communicating through openings 51 in the member 68 with the first zone 48 for supplying the pressurized air at the first pressure thereto.

The above-described gas supply means further comprises a duct 52 which is operatively connected to an appropriate source of pressurized gas such as air for supplying this pressurized air at a second pressure which is higher than the first pressure to a second zone 53 which extends within the tubular mold tunnel 21 between the first sealing arrangement 35 and the second sealing arrangement 39, this pressurized air at the second pressure serving to urge the tube 34 outwardly into the corrugations 49 of the corrugated wall of the tubular mold tunnel 21.

It will be noted that the area 54 of the tube 34 of thermoplastic material is unsupported by the corrugated wall of the tubular mold tunnel 21 and in this area 54 the thermoplastic material of the tube 34 is at a high temperature and hence is relatively soft so that rupturing of the tube 34 in this area 54 could readily occur. However, as hereinbefore described the pressurized air operatively supplied to the first zone 48 is at the first pressure which is a relatively low pressure which need be sufficient merely to cause the tube 34 to be supported against the wall of the tubular mold tunnel 21, thereby minimizing any tendency to cause rupturing of the area 54 of the tube 34. The thermoplastic material of the tube 34 is urged into the corrugations 49 of the corrugated wall of the tubular mold tunnel 21 by the pressurized air which is supplied to the second zone 53, this pressurized air supplied to the second zone 53 being at the required higher second pressure.

In relation to each of the first and second sealing arrangements 35 and 39, respectively, it is preferred that the number and dimensions of the rings 37 or 41 relative to the spacing and dimensions of the corrugations 49 of the corrugated wall of the tubular mold tunnel 21 be such that at least one of the rings 37 or 41 is substantially in sealing contact with the tube 34 irrespective of the operative positioning of the corrugations 49, thereby to ensure that the sealing arrangements 35 and 39 are substantially in sealing contact with the tube 34 at all times during normal operation of the apparatus. However, if desired, the rings 37 of the first sealing arrangement 35 may, when the apparatus is in use, be slightly spaced from the tube 34 to permit controlled leakage of pressurized air from the second zone 53 to the first zone 48. In this case, during normal operation of the apparatus the supply of pressurized air through the duct 47 may be discontinued with the supply of pressurized air at the first pressure to the first zone 48 being constituted by this leakage of pressurized air from the second zone 53 past the first sealing arrangement 35 to the first zone 48, air being permitted to exhaust from the first zone 48 through the duct 47, or being extracted from the first zone 48 through the duct 47 under the influence of a suction pump, in order to prevent excessive increase in the pressure of the air in the first zone 48.

It will be appreciated that, while the forward end of the tube 34 advances through the first zone 48 during initial operation of the apparatus and until this forward end of the tube 34 advances beyond the first zone 48 and enters substantially into sealing contact with the first sealing arrangement 35, the sealing arrangement 35 may not serve adequately to seal the downstream end of the first zone 48. In this case, it is necessary, during this initial operation of the apparatus, for the pressurized air to the first zone 48 to be supplied at a first, relatively high volumetric rate in order to compensate for the leakage of air past the first sealing arrangement 35 and thus ensure that the extruded tube 34 of thermoplastic material does not collapse, the volumetric rate at which the pressurized air is supplied to the first zone 48 being reduced to a second lower valve once the forward end of the tube 34 of thermoplastic material advances beyond the first zone 48 and enters substantially into sealing contact with the first sealing arrangement 35.

A duct 55 which is connectible to a source of cooling fluid such as cooling air is disposed through the member 29 and communicates with the interior of the tube 43, this tube 43 communicating through openings 56 with the interior of the tubular mold tunnel 21 between the second sealing arrangement 39 and the annular seal 46 so that the cooling air may operatively be discharged into the interior of the tube 34 between the sealing arrangement 39 and the annular seal 46 for cooling and setting the thermoplastic material of the tube 34. To assist cooling of this cooling air a cooling coil 57 may be mounted on the tube 43 between the sealing arrangement 39 and the annular seal 46, this cooling coil 57 being connected with a pair of ducts 58 and 59 which are disposed through the tube 43 and through the member 29 for the flow of cooling fluid through the coil 57.

As shown in FIG. 1, each mold assembly 14, 15 may further comprise an air distribution duct 60, 61 extending along the return run of the mold blocks 16 of the respective mold assembly 14 or 15 and positioned to distribute cooling air to the exposed interior surfaces of the mold block 16 as they travel along the return run. The distribution ducts 60, 61 are each connected to a respective blower 62, 63 by which the cooling air is supplied to the ducts 60, 61, respectively. Each mold assembly 14, 15 further comprises a heat sink provided by a tank through which cooling water may be circulated, inlet and outlet connections 64, 65 and 64a, 65a being shown. The mold assembly housings may be cooled in this manner during a molding operation; however, in order to avoid wastage of material at the commencement of a molding operation the water in the housings may be preheated to the required temperature by electrical immersion heaters mounted in the walls of the housings as shown at 66, 67.

What we claim is:

1. Apparatus for producing corrugated thermoplastic tubing, the apparatus comprising a pair of complementary mold assemblies each of which has an endless array of articulately interconnected mold blocks, drive means for driving the mold blocks of each mold assembly in synchronism with the mold blocks of the other mold assembly along a forward run in which the mold blocks of the mold assemblies are in cooperative interengagement to provide an axially extending tubular mold tunnel having a corrugated wall, and back along a return run, an extrusion head disposed at the entrance to the tubular mold tunnel for forming a tube of thermoplastic material, and gas supply means for supplying pressurized gas at a first pressure to a first zone within the tube of thermoplastic material in the tubular mold tunnel for supporting said tube against the cooperatively interengaged mold blocks forming the tunnel, and for supplying pressurized gas at a second pressure which is higher than said first pressure to a second zone within the tube of thermoplastic material in the tubular mold tunnel for urging said tube outwardly into the corrugations in the wall of the tubular mold tunnel, a first sealing arrangement separating the first zone which is disposed adjacent to the extrusion head from the second zone which is disposed downstream of the first zone, and a second sealing arrangement defining the downstream end of the second zone.

2. Apparatus according to claim 1, wherein said gas supply means comprises means for supplying pressurized gas to said first zone at a first volumetric rate during initial operation of the apparatus, and for supplying pressurized gas to said first zone at a second volumetric rate which is lower than said first volumetric rate after the tube of thermoplastic material advances beyond the first sealing arrangement and enters substantially into sealing contact with the first sealing arrangement.

3. Apparatus according to claim 1, wherein the first sealing arrangement comprises a plurality of axially spaced members at least one of which is substantially in sealing contact with the tube of thermoplastic material irrespective of the operative positioning of the corrugations in the wall of the tubular mold tunnel.

4. Apparatus according to claim 1, wherein the second sealing arrangement comprises a plurality of axially spaced members at least one of which is substantially in sealing contact with the tube of thermoplastic material irrespective of the operative positioning of the corrugations in the wall of the tubular mold tunnel.

5. Apparatus according to claim 3, wherein said plurality of axially spaced members of the first sealing arrangement comprises a plurality of axially spaced rings of resiliently deformable material, the inner peripheral portion of each ring being fixedly secured.

6. Apparatus according to claim 4, wherein said plurality of axially spaced members of the second sealing arrangement comprises a plurality of axially spaced rings of resiliently deformable material, the inner peripheral portion of each ring being fixedly secured.

7. Apparatus according to claim 1, wherein the first sealing arrangement is operatively slightly spaced from the tube of thermoplastic material to permit controlled leakage of pressurized gas from the second zone to the first zone.

8. A method of producing corrugated thermoplastic tubing, the method comprising extruding a tube of thermoplastic material from an extrusion head into the entrance of an axially extending corrugated walled, tubular mold tunnel which is formed by cooperatively interengaged mold blocks of a pair of complementary mold assemblies driven in synchronism along a forward run and back along a return run, the mold blocks of each mold assembly being articulately interconnected in an endless array, supplying pressurized gas at a first pressure to a first pressurizable zone within the tube of thermoplastic material in the tubular mold tunnel to support said tube against the cooperatively interengaged mold blocks forming the tunnel, and supplying pressurized gas at a second pressure which is higher than said first pressure to a second pressurizable zone within the tube of thermoplastic material in the tubular mold tunnel to urge said tube outwardly into the corrugations in the wall of the tubular mold tunnel, the first zone being disposed adjacent to the extrusion head at the entrance of the tubular mold tunnel and being separated by a first sealing arrangement from the second zone which is disposed downstream of the first zone and the downstream end of which is defined by a second sealing arrangement.

9. A method according to claim 8, wherein said supplying of pressurized gas to the first zone comprises the steps of supplying pressurized gas to said first zone at a first volumetric rate while the forward end of the tube of thermoplastic material advances through the first zone during initial performance of the method, and supplying pressurized gas to said first zone at a second volumetric rate which is lower than said first volumetric rate after the forward end of the tube of thermoplastic material advances beyond the first zone into the second zone and the tube enters substantially into sealing contact with the first sealing arrangement separating the first zone from the second zone.

10. A method according to claim 8, wherein the pressurized air supplied at the first pressure to the first zone comprises pressurized air which leaks from the second zone to the first zone.

* * * * *